Patented Jan. 8, 1946

2,392,518

UNITED STATES PATENT OFFICE 2,392,518

PLANT STIMULANTS AND METHODS OF MAKING THEM

George B. Barnhill, Oakland, Calif., assignor of one-half to Herbert B. Moses, San Francisco, Calif.

No Drawing. Application August 16, 1941, Serial No. 407,250

11 Claims. (Cl. 71—2)

This invention relates to the application to growing plants, crops, vegetation, and the like, which grow in or into the air, of substances, very small quantities of which stimulate the growth thereof or of parts thereof in an apparently catalytic manner. Such substances appear to function more or less as general or special stimulants or tonics, apparently by aiding the conversion of available plant food into the plant itself. The term plants will be used hereinafter in this description and in the appended claims in a generic sense to include such plants, crops, vegetation, and the like.

Research in recent years has developed that certain substances belonging to the classes of vitamins and hormones, and possibly substances not strictly classifiable under such headings, have the above-mentioned growth-stimulating power on mere contact with certain plants. Whatever their strict classification may be, they have been referred to as plant growth substances, plant hormones, plant growth stimulants, and the like. The term stimulant will be used in a generic sense to designate them hereafter in this description and in the appended claims. Among them are, for example, vitamin $B_1$ (thiamin chloride hydrochloride), vitamin $B_6$, nicotinic acid, ascorbic acid, indolebutyric acid, indoleacetic acid, indolepropionic acid, alphanaphthaleneacetic acid, phenylacetic acid, and fluoreneacetic acid. The Bureau of Plant Industry of the United States Department of Agriculture has references to the use, also, of indole-3-butyric acid on pecan seedlings, naphthaleneacetic acid, naphthalene acetamide, colchinine, and thiourea, as well as some of the substances previously mentioned, and possibly others as well. They have been used, more for research and experiment than commercially or industrially, in various ways, such as: being dissolved in the water with which the plant is supplied, thus reaching the roots of the plant; being supplied directly to the surface of the stems or leaves in various mixtures with water or fatlike substances such as oils or lanolin or as emulsions with fatlike substances in water; or as a dust made by dissolving the chemical in grain alcohol, wetting powdered talc with the solution, drying, and powdering the mass. Only minute quantities of the stimulants themselves are required, the proportions used in the powder being from one (1) part in two hundred (200) parts by weight of powder to one (1) part in one million parts of powder. When carried to the roots by the water fed to the plant, the amount of stimulant used was from 0.01 to 10 parts to each million parts of water. Where the foliage was sprayed, concentrations ranged from fifteen (15) to six hundred (600) parts per million parts of water or emulsion.

Various effects have resulted on using the stimulants. There has been improved growth of the whole plant, improved growth of a part of the plant, perhaps but not necessarily at the expense of another part, and there has been no improved growth at all. Some kinds of plants may react better to certain stimulants than other kinds. Identical plants may react differently to the identical stimulant applied in the identical manner under apparently the same conditions but actually under different conditions which apparently have not heretofore been recognized as substantially different. For example, identical plants may react well to a properly applied stimulant in one locality, less so in another locality, and not at all in still another locality, although the stimulant, the amounts thereof, and the way of applying, were identical. Results have thus been of various kinds, and they have been variable in degree, even to the extent of being entirely lacking, and they appeared to have been erratic and unreliable.

Objects of this invention are: to lessen the difficulties heretofore encountered; to lessen the uncertainty and variability of effect of the applied growth-stimulating materials; to conserve the applied growth-stimulating materials; to conserve and make useful their growth-stimulating properties; to provide methods and means for applying the growth-stimulants to the plants; to cause the stimulants to adhere to the parts of the plants to which they are applied; to permit absorption of the stimulants by such plants; to make plants grow better and faster; to increase crop production; to obtain an even distribution of a small amount of stimulant over a large area; to accomplish such results simply, easily, quickly, inexpensively and economically; and other objects will be apparent on reading this specification.

The dosage per acre of growing plants is usually to be very small. As an example, good results were obtained, according to this invention, by dusting thirty pounds (30 lbs.) per acre with a product containing forty (40) grams of a stimulant per ton of product. The applied dosage thus amounts to six tenths (0.6) of a gram per acre. While it might be best to apply different dosages of the same stimulant for different plants, or different dosages of different stimulants, yet all dosages will best be of the order measured by grams per acre, except, perhaps, in very exceptional cases. Ordinarily the amount of stimulant should not be less than forty (40) grams per ton for very good results, although it may vary between twenty (20) and one hundred (100) grams per ton. Some stimulants are effective even when attenuated to unbelievably small amounts. Most of the stimulants are expensive and too much stimulant should be avoided. Even distribution of a gram of stimulant, or of any other material, over an area of an acre, even by dusting from an airplane, is a physical impossibility unless that material is so evenly dispersed or diluted in something else to such an extent that slight variations in the weights applied at one place or another are not reflected as very large variations in dosage. For example, using straight undiluted or undispersed stimulant, a variation of three tenths (0.3) of a gram in the material applied to the two halves of an acre would mean that one half of the acre received the dosage for the whole acre and the other half received none, a variation of one hundred percent (100%) in the applied dosage. But a variation of as much as one pound, if the six tenths of a gram of the stimulant were evenly distributed throughout thirty pounds of material, would cause a variation in the applied dosage of only about three percent (3%).

Certain plants do not respond well to certain growth stimulants. Some plants may make their own growth stimulant and some may not be responsive to the application of a growth stimulant for some other reason or reasons; and the artificial addition of each growth stimulant is not necessarily effective to the same degree or effective at all on each different kind of plant. This invention relates to the method and means for applying growth-stimulants to plants rather than to the choice of a particular stimulant for a particular plant apart from such method and means.

I accomplish the objects of this invention and obtain an even distribution of the stimulant, with the effectiveness of the stimulant maintained stable and at a high degree even under conditions under which it was formerly ineffective, by the use of a special type of diluent carrier having special characteristics. Various diluent carriers will be described before referring to such special characteristics. The preferred diluent carrier is like that referred to in my prior Patent No. 2,014,609 patented September 17, 1935, such carrier protecting and stabilizing the growth-stimulating effect and decreasing the variability of results, as will be explained hereafter. Whatever growth stimulant is to be used, it may be mixed with such preferred diluent carrier or with any other having the desired characteristics.

The aforesaid patent refers to the use of foots resulting from various fining treatments of various oils in the carrier, and other diluent carriers not necessarily including any such foots will be described hereinafter. At the present time, however, I prefer to use the foots. They preferably comprise foots from the fining or refining of animal or vegetable oils which are fatty acid glyceride esters, rather than foots from the similar treatments of mineral oils, because fatty ester oils have a better and less harmful effect on the plants than mineral oils, as explained in such patent. Many refineries of fatty ester oils are scattered throughout this country and their waste by-product foots are easily obtainable. Also, as explained in such patent, various adsorbent materials, such for example as certain types of clays, fuller's earths, silicates, silicas, bone char, activated carbons, and the like, are used for the fining or refining of oils, including filtering, bleaching, decolorizing, clarifying, deodorizing, deacidizing, and the like, these usually removing the undesired materials from the oils by an adsorbent or contact action.

The fining or refining materials have each a certain capacity for removing and retaining the undesired materials, and when this capacity is reached they become exhausted and no longer have the desired effect. It may perhaps be possible to revivify or reactivate at least some of the exhausted fining materials, which, however, has not been found very expedient in the fatty ester oil industry. Revivification or reactivation of the exhausted fining material generally results in only a lesser fining capacity and shorter working life of the material than previously. The exhausted materials are known as foots, include the retained impurities, and are saturated with the oil, whether or not they had been reactivated or revivified.

The fining material in such foots is thoroughly saturated with oil due to the manner of use, pores, crevasses, interstices or other openings therein being sealed by the oil against entry of the stimulant thereinto. This is a valuable feature because any such stimulant, if it entered and remained in any such opening, would thereby not be available to the plant to which it is to be applied. The oil content of the foots may vary with the nature of the refining process and with economic conditions including the value of the refined oil. While oil could be extracted from the foots it is generally not expedient to do so, at least in the preparation of oil for salad dressings and the like at the present time. The oil content of the foots may run up to thirty to forty-five percent, thus containing too much oil and being too oily for the application by dusting, for example, from an airplane. To prepare it for such use the oil content may be reduced by intermixing therewith any non-alkaline finely divided solid material, or one which has been made non-alkaline by inclusion of acid material, for example citric acid, either refined or crude as produced by plants packing or otherwise handling citrus fruits. Adsorbent or absorbent material is preferred because it takes up the excess of oil on and within itself. Fresh fining material which is non-alkaline functions well, and, more specifically, I prefer a non-alkaline filtering clay. A fifteen percent (15%) oil content is suitable for dusting, and this may vary down to five percent (5%) and still afford good dusting qualities. These are not necessarily strict limits but rather representative of a good range for dusting. An oil content of twelve to fifteen percent (12 to 15%) is preferred. This is explained in my prior patent referred to above, and the same percentages and degrees of oiliness are suitable for applying the growth stimulants by dusting with an airplane. Such reduction of the oil content is usually necessary if the oil has not lost fluidity by hardening. In foots from the fining of a drying oil, the oil may harden by drying to a greater or lesser extent; and in foots from the fining of a hydrogenated oil, the oil may be in a more or less harder or more solid state due to such hydrogenation. In either case less reduction of oil content is necessary and less material need be added to reduce the oiliness, the amount being dependent on the circumstances. Care should be taken, however, not to use foots in which the oil has hardened or solidified to such an extent that the foots have lost too much of their stickiness.

A description of the technique of manufacture which I prefer, when making the diluent carrier of the above-mentioned foots, follows: The foots of the fatty ester oil refining, as delivered by an oil refinery, contained about thirty percent (30%) of oil by weight and had a higher degree of oiliness than the optimum desired for dusting. An amount of fresh non-alkaline refining clay, sufficient to reduce the oil content to twelve percent to thirteen per cent (12% to 13%) by weight was thoroughly ground together with the foots from treating an oil to be used as a salad oil. This may be a naturally non-alkaline clay or one treated with acid to make it so. It may be a second or lower grade refining material which may contain iron and impart an undesired color to oil treated therewith and therefore not desirable for treating oil. Such color is not objectionable in my product which is generally black or almost so, as described hereinafter, and the use of such a material is more economical than if the best grade were used, on account of the relative costs. This amounted to about one hundred seventy pounds (170 lbs.) of fresh material to one hundred pounds (100 lbs.) of foots. Grinding is preferably in a continuously operating Raymond or other suitable mill with the resulting very fine material floated away in a current of air. The added fresh material present is not fine enough for any substantial amount to be carried away by the air current until it has been sufficiently mixed by the grinding operation to insure that any pores, crevasses, interstices or other small cavities or openings therein are substantially all blocked by the oil against entry thereinto of the stimulant added later. Should there be any substantial amount of the added material fine enough to be removed by the air current before any small cavities or openings therein are substantially all so blocked off, then I grind and thereby intermix the materials together without using the air current until such blocking has been effected, whereafter the air current may be used with further grinding. Different types of mills may be used, the Raymond type generally giving satisfactory results. A good product is one, about ninety six percent (96%) of which will pass through a two hundred (200) mesh screen. It is such a product which floats off with the air current if the oiliness has been reduced sufficiently; but the mass will not grind down to such a screen analysis and float off with the air current, but it will stick to and foul the mill parts which it contacts, if it is too oily.

I do more than merely mix the materials together in the mill, and fill or at least bridge over and thereby seal, as far as possible, the pores, cells or other cavities or interstices in the fresh clay against the ingress of the stimulant with the free oil which provides the oiliness of the foots. By doing this, loss of the stimulant used by entering the cavities and being retained therein is prevented. Only very small quantities of the stimulants are needed by the plants and the proportion of stimulant to carrier in the completed mass is very small, of the order of a few parts per hundred thousand. Loss of even a small amount of the stimulant in the cavities or interstices would amount to a loss of a large proportion thereof, which amounts to waste and is undesirable because of the high cost of some if not of all of the stimulants.

While I have stated the amount of fresh clay to be added to the foots obtained from a particular fatty oil refinery, the foots produced by some other refinery may be somewhat different and require a different amount of material to be added to produce a similar degree of oiliness. Such foots may contain a different proportion of oil having the same characteristics and this can be taken care of by adjusting the amount of added material. More, or less, added material may be required to produce the same degree of oiliness for different kinds of oil, and less material need be added to obtain the right degree of oiliness if the foots contain oil which has hardened by drying, hydrogenation, or perhaps otherwise. The degree of oiliness depends usually on the proportion of oil present and on the physical condition of such oil. The capability of grinding well in a Raymond mill without clogging it up is an indication that the oiliness of the mixture is sufficiently low for the product to be easily dusted. It is preferred that the product have sufficient stickiness to adhere well to the plants onto which it is dusted. This can be tested by placing some on a clean glass plate, tilting the plate, and tapping the plate while tilted to make the powder run down the incline and leave a streak thereof behind. If this streak cannot be easily removed by a person blowing on it, the material is sufficiently sticky.

The material prepared as described above has the right qualities for being dusted from an airplane, and also by a manually or automatically operable duster on the ground. I call it the "blank," and it is ready for the stimulant to be intermixed therewith.

I will describe an illustrative method of intermixing vitamin $B_1$ therewith, as illustrative of how very small quantities of any desired stimulant may be added to the blank. Forty grams (40 gms.), or somewhat more, of vitamin $B_1$ powder, the finer this powder the better, and a small part of the blank, say one hundred pounds (100 lbs.), are mixed together, preferably in a small batch mixer capable of holding this amount of material, in order to form a preliminary mix. The mixing should be thorough with a view to uniformity. Grinding is generally not required with this mixing step. As a check on the uniformity of the product, I prefer to add a small amount of rouge or other colored material in the form of a fine powder, which material should not decrease the effectiveness of the stimulant. The whole mixture will be uniform when the color has been uniformly blended into the mass, with no difference of color or shade apparent to the naked eye and even with small representative samples under a microscope in order to be sure of even distribution.

The resulting preliminary mix is then thoroughly mixed with the balance of the blank, namely nineteen hundred pounds (1900 lbs.) thereof, to produce practically one (1) ton of finished material containing forty grams (40 gms.) of vitamin $B_1$. Very complete mixing is highly desirable, in this step as well as in making the preliminary mixture, because of the very small proportion of vitamin $B_1$ (or other stimulant) used. Vitamin $B_1$ or other stimulant may be intermixed with the carrier in any suitable manner, but I usually prefer that described above.

I have found that forty grams (40 gms.) of vitamin $B_1$ per ton is a useful proportion for dusting onto or otherwise applying to some growing plants, taking into consideration various prevailing conditions, technical, economical, or otherwise. For other plants, a different proportion may be the optimum, and different proportions of other stimulants may be preferable. The particular preferred proportions in each instance are to be determined by the particular existing conditions, but in each instance they will be of the order indicated by grams per ton.

Prepared as described above, the product contains the stimulant in what might be called a very diluted or dispersed condition, which is generally permissible because only minute quantities of the stimulants are generally required and which is economically essential on account of the high cost of the stimulants. The product has the right characteristics to be dusted from an airplane, which permits of speedy treatment of a few up to hundreds or thousands of acres on which the plants to be treated are growing. Dusting from the ground is usually preferred for small areas. Dusting usually treats only the parts of the plants above the ground, but transplantable plants including some seedlings may be dusted with the roots exposed so that the product is applied to the roots, whereupon these plants may be planted, if desired, with their roots in the ground with the product adhering thereto. Or, the roots may be otherwise contacted with some of the product and planted with the product adhering thereto. Seeds and cuttings may also be contacted with the material and planted with the material adhering thereto. It is not always necessary to plant immediately, and the roots or seeds may absorb some of the stimulant before planting.

Other diluent carriers will now be described. Coal, glass, talc, stone, sand, or almost any other material solid at atmospheric temperatures may be converted into finely divided form. The particles are to be coated with sticky material, if they are not composed of sticky material, and any minute pores, cracks or other interstices in the particles either filled, bridged over, or otherwise sealed off against the ingress of the stimulant. This may be accomplished by grinding a powder of the particular material or materials chosen in a sticky substance, preferably a fatty oil which need not necessarily have been refined and may be in a more or less crude state. It may also be accomplished by grinding the solid material to a powder in the sticky substance. Such material may be used as the diluent carrier, and for dusting purposes, the proportions of solids to sticky material should be so chosen as to make the product dustable, sticky and with no pores, cracks or other interstices in the solid particles open to ingress of the stimulant. Proper proportions are variable, depending on the nature and proportions of the materials used and on the proportion of sticky material entering into the pores, cracks, or other interstices. One material or the other may be added until the uniformly mixed mass has the characteristics of the foots diluent carrier described above, in order to determine the best proportions the first time a new combination of ingredients is used. After these diluent carriers have been completed, the stimulant may be intermixed therewith as described above with respect to the foots carrier, preferably by intimately mixing the whole amount of stimulant with a small proportion of the carrier and then intimately mixing the resulting preliminary mixture with the balance of the carrier.

Whatever the nature of the solid particles therein, the diluent carrier may contain more oil or sticky substance if the material is to be applied to the plants by contacting the roots or other parts with a mass of the material, by spraying onto the plants water, oil, an emulsion of both, or any other liquid in which the material is suspended and dispersed, or if the material is to be applied to the plants in any other manner other than by dusting. Liquid oil in contact with foliage has a tendency to clog up the breathing mechanism thereof, for which reason I prefer not to use liquid oil as such or in emulsion, but preferably only as a part of the dust.

Any of the above mentioned diluent carrier particles or their equivalents may be used alone or in any combinations of mixtures. At the present time I prefer the foots particles because they are already thoroughly saturated with oil and because they are inexpensive.

The diluent carriers made according to this invention do not have, at the time the stimulant is mixed therewith or thereafter, any pores, crevasses, interstices, or other cavities or openings into which the stimulant can enter, be retained therein, and thereby be prevented from contacting the plant and thus becoming practically ineffective. Whatever cavities or openings there may be therein, whether microscopic or macroscopic, are sealed against entry of the stimulant before it is intermixed with the diluent carrier. With the dosage of stimulant at about six-tenths (0.6) of a gram per acre, the loss of the effect of even a fraction of a gram becomes so important as to make its prevention highly desirable.

I believe this explains why the prior method of using talc gave such generally poor and uncertain results. Such method consisted in dissolving the stimulant, adding the resulting solution to powdered talc, getting rid of the solvent and powdering the resulting mass. Loss of stimulant by entrapment within the particles of the diluent carrier, namely the talc, was not prevented, as is the case with my invention; and in fact entrapment was furthered by soaking the talc in the solution of the stimulant. My diluent carriers are by their very nature prevented from entrapping the stimulant.

The diluent carriers made according to this invention have the added advantage over those previously used or proposed of being sticky enough, whether they are in condition to be applied by dusting, or otherwise, to act as means to retain the stimulant on the plant; and they have the further advantage of not preventing the plant from taking up or absorbing the stimulant.

They have the further advantage of furnishing a non-alkaline medium in which the growth stimulant is held and maintained due to the nature of the preferred oils, namely the fatty ester oils. These oils turn rancid very easily, especially when crude and unrefined. The foots contain not only unrefined oil, but also impurities in more concentrated condition and in greater proportion than in the crude oils. Such oils are, accordingly, usually acid and not alkaline because of their rancidity. Rancidity offers an advantage because there seems to be better absorption by plants of coconut and other fatty ester oils or of components thereof, if they are rancid. If for any reason an oil should be used which does not insure a sufficient degree of acidity of the mass, then such degree of acidity may be ensured by incorporating into the mass an acid reagent, preferably one which does not harm the plants or the apparatus used to apply the mass. Citric acid serves this purpose well and a commercially crude grade may be used. The citric acid may also be used to take care of any alkalinity or lack of acidity due to the incorporation of alkaline clay or other alkaline material into the mass. It is best added as a powder, and well mixed with the carrier before the stimulant is mixed therewith.

Vitamin B₁, as well as many of the other plant growth stimulants, are rendered inert by alkalies which cause them to lose their growth stimulating properties. Certain of the plant growth stimulants are acid in nature due to the presence of the acid carboxyl group (—COOH) in their structural formula. Others do not have such a group but nevertheless are acid in nature, for example, vitamin B₁ which is variously known in commerce as thiamin, thiamin chloride, thiamin hydrochloride, thiamin chloride hydrochloride, and betabion, which is chemically a pyrimidine-thiazol compound, and has the following structural formula:

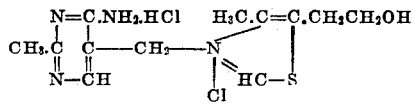

Its aqueous solution of a strength of one to twenty (1:20) has a pH of about 3.5.

My diluent carrier thus protects such stimulants from and stabilizes them against alkaline conditions, such as alkaline soil if the stimulant is to be in the ground, alkaline dust blown about by the wind if the stimulant is to be above ground, and the like. This protection against alkalinity is more than protection against being on the alkaline side of absolute neutral, and insures at least the degree of acidity required for maintaining the growth stimulant effectiveness. I do not know the exact degrees of alkalinity or acidity at which the effectiveness of the different stimulants decrease or are lost, but it is sufficient and useful as a matter of safety in such cases to maintain at least that degree of acidity which the particular material has when supplied by the manufacturer thereof. My foots and other oily diluent carriers do that; and if any other useful diluent carrier does not do so per se, then a suitable acid may be added to it as referred to above.

The question of alkalinity is an important one and explains, I believe, why stimulants have heretofore not been generally effective and specifically why vitamin B₁ has not been effective on canteloupe plants in the Imperial Valley in California when applied in the prior art manner, although it has been effective thereon in some other localities when so applied, and why it has been effective on such plants in the Imperial Valley when carried by my diluent carrier. Soils and dust raised by the winds in the Imperial Valley are alkaline and thus render stimulant inert unless protected by my carrier. Soils in the Yuma Valley and in the Salt River Valley, both in Arizona, are also alkaline. These three valleys, before being reclaimed, were alkali deserts. Much formerly useless land has been reclaimed by irrigation and much of the water used for irrigation in the Southwest contains a very substantial proportion of salts and has a pH on the alkaline side. There is, for example, more than a ton of total salts in an acre foot of Colorado River water used for irrigation in the Imperial and Yuma Valleys; and water from Coolidge Dam used for irrigation in the Salt River Valley, while containing less salts and less alkalinity than Colorado River water, yet contains very substantial amounts thereof. Salts in large amounts have a bad effect on the growth of many kinds of plants, and many growing plants subjected to salts thus have an added need for plant growth stimulants which it was heretofore impossible to supply effectively on account of the prevalent alkalinity. It is generally not material whether the salts render the stimulants more or less inert, because my carriers protect them therefrom.

Most foots are black due to black material therein, some kind of a fining carbon being frequently used with any other fining material present. A black or almost black carrier appears to provide a better effect, perhaps by the protection it affords against the actinic rays of the sun, and for that reason I prefer to add carbon black or other black material to the carrier if it is not already black or almost so. The added material should of course not be of such a nature as to decrease the effectiveness of the stimulant.

Foots from the treatment of coconut oil is preferred, because the stimulating action seems to be greater than when foots from the treatment of other oils, even though they are fatty esters, are used. For making a diluent carrier from coal, stone, glass, and the like, I prefer coconut oil, and more particularly the crude, as the sticky ingredient. The additional beneficial action of the coconut foots or crude oil seems to be due to more or less unidentified plant growth stimulants normally present in crude coconut oil. Whatever oil is used, a rancid condition is preferred as the plants apparently absorb a rancid oil better than if not rancid.

Any of the substances which kill, repel, or otherwise make pests of various kinds ineffective to injure plants adjacent to which such a substance is present may be incorporated into the composition comprising a plant growth stimulant and a carrier having characteristics useful according to this invention. Such a substance may be disintegrated or ground up derris root, pyrethrum, cubé or timbo, or any of the active material normally present therein, any of the substances mentioned in my prior patent mentioned above for a similar purpose, or any other suitable substance. It is preferred, wherever expedient, to avoid the presence of a substance toxic to warm blooded animals including human beings and to use instead a substance which is non-toxic to them, in order to avoid the possibility of ingesting or eating even a small amount of the toxic poison. The substance which protects the plants against the inroads of the pests must, however, either be of such a nature as not to make the stimulant present ineffective, or steps must be taken to overcome such action by having enough citric or other suitable acid present to overcome any harmful alkalinizing effect of the protector against pests, or otherwise. Substances which kill, repel, or otherwise make pests ineffective to damage the plants are generally used in entirely different and much larger proportions than the stimulants. For example, there should generally be about sixteen pounds (16 lbs.) of derris root to eighty-four pounds (84 lbs.) of carrier, and about forty pounds (40 lbs.) of Epsom salts to sixty pounds (60 lbs.) of carrier. Proportions of the protectors against pests should be of such an order, with the order of proportion of stimulant described above, namely as indicated in grams per ton. The proportion of stimulant required and present in any of my products is generally very small, whatever particular stimulant is used. The exact proportion which it is best to use depends on a number of factors, such as: which plants are to be treated; which stimulant is to be used; the relative difficulty in evenly distributing different amounts of stimulant in a ton of diluent carrier and in evenly distributing products containing different proportions of stimulant on a group of plants; the cost per gram of the stimulant, which determines how uneconomical it is to waste even a small amount thereof; the size of the leaves of the plants to be treated and the spaces between the leaves, which determines how much of the applied material will be wasted by falling onto the ground; how much the plant needs; whether it is better to make only one or several applications; and there may be other factors as well. Forty to fifty (40 to 50) grams per ton is usually a suitable proportion, which in some instances may be varied to twenty to one hundred (20 to 100) grams per ton, or even beyond. Growth stimulation of different kinds of plants is caused by different stimulants applied in various ways. Vitamin $B_1$, when dusted onto certain growing plants stimulates the growth thereof, perhaps in different ways depending on the particular plants. It is reported that watermelons, cantaloupes, casaba, honeydew, and other types of melons, cucumbers, squash, pumpkin, citron, gourds, cabbage, Brussels sprouts, broccoli, chard, kohlrabi, cauliflower, turnips, radishes, mustard, tobacco, and others are beneficially affected. Vine growth may be increased. More sugar may be developed, without necessarily increasing the size or the number of the articles of produce. Sometimes the effect is merely to make the plant healthier and better able to withstand the effects of plant diseases, the presence of more or less harmful salts or other materials, or other adverse conditions.

The purpose of this invention is however, not to determine which particular plants can be stimulated to grow better or which particular stimulants to use in each instance, all of which can easily be determined by trial, particularly with the knowledge imparted by this description. It is to be emphasized that the invention does lie in the particular manner of applying the stimulant to the plant and in the diluent carrier, means, or composition of matter by which it can be applied, to give improved results with respect to stimulants which are now known as well as with respect to those that may be developed or discovered hereafter, where the use of my carrier with them results in an improved effect.

I have referred to various details for the purpose of illustrating what the invention is and how to make and use it, but some of such details may be varied without departing from the spirit of the invention, the scope of which is defined in the appended claims.

The vitamins, hormones, and similar substances, to which this invention is applicable, will be referred to in the appended claims generically as vitamin-hormone type stimulants. Minute pores, cracks, crevasses, interstices, cavities or other openings capable of entrapping and withholding intermixed stimulant from its intended application will be referred to in the appended claims generically as openings. Such openings normally present in the particles of diluent carrier, whether they be merely bridged over or filled to an extent sufficient to prevent entry, entrapment and retention of an essential proportion of the stimulant present, will be referred to in the appended claims as clogged.

I claim:

1. A plant stimulant composition, comprising a substantially uniform admixture of a minute proportion of finely divided vitamin-hormone type plant stimulant and a large proportion of solid particles of other material comprising diluent carrier, said particles normally having openings therein capable of entrapping and retaining and thereby making inactive an essential proportion of said stimulant present, said openings being clogged, prior to the time of admixing and permanently thereafter, against said entrapment and retention.

2. A plant stimulant composition comprising a substantially uniform admixture of a minute proportion of finely divided vitamin-hormone type plant stimulant, the stimulating effect of which decreases substantially when in an alkaline medium, a large proportion of solid particles of other material comprising diluent carrier, and rancid coconut oil to make said stimulant adhere to said carrier particles and to provide and maintain a stabilizing medium for said stimulant, said particles being substantially free, at the time of admixing and permanently thereafter, from openings actively capable of entrapping and retaining and thereby making inactive any essential proportion of said stimulant present.

3. A plant stimulant composition comprising a minute proportion of vitamin-hormone type plant stimulant and a large proportion of the foots of sorption refining of fatty ester oil.

4. A plant stimulant composition comprising a minute proportion of vitamin-hormone type stimulant, the stimulating effect of which decreases substantially when in an alkaline medium, and a large proportion of the rancid foots of sorption refining of coconut oil.

5. The method of preparing a vitamin-hormone type plant stimulant for application to plants in minute dosages, which comprises treating fine solid particles with a sticky stabilizing medium for said stimulant to make a sticky dust and block substantially all openings in said particles actively capable of entrapping and retaining and thereby making inactive any essential proportion of said stimulant to be intermixed in a minute proportion therewith, intermixing said stimulant with a portion only of the resulting treated particles and with a small proportion of coloring matter until uniformity in color appears, said portion of the coated saturated particles being only a small port of the whole but large in comparison to said minute proportion of said stimulant, and intermixing the resulting mass with the balance of said treated particles until uniformity in color again appears.

6. The method of making a plant stimulant composition for applying a vitamin-hormone type plant stimulant in an amount of the general order of approximately six-tenths (0.6) of a gram per acre, which comprises treating fine solid particles with a rancidifiable fatty ester oil to make an oily dust and block substantially all openings in said particles actively capable of entrapping and retaining and thereby making inactive any essential proportion of said stimulant to be intermixed therewith in a minute proportion of the general order of approximately forty (40) grams per ton, intermixing the amount of said stimulant per ton of product with a portion of the general order of about one hundred pounds (100 lbs.) of said treated particles and a small proportion of coloring matter until uniformity in color appears, and intermixing the resulting mass with the balance of the ton of said treated particles until uniformity in color again appears.

7. A stimulant composition comprising a vitamin-hormone type stimulant and slightly acid fatty ester material capable of protecting said stimulant from loss of potency by material which would normally decrease the potency of said stimulant if in contact therewith.

8. A vitamin-hormone type stimulant which undergoes a loss of potency on contact with alkaline material, protected by rancid fatty ester against such contact to decrease such loss.

9. The method of preparing a vitamin-hormone type plant stimulant for application to plants in minute dosages, which comprises treating fine solid particles with a rancidifiable fatty ester oil to make a sticky dust and block substantially all openings in said particles actively capable of entrapping and retaining and thereby making inactive any essential proportion of said stimulant to be intermixed in a minute proportion therewith, intermixing said stimulant with a portion only of the resulting treated particles and with a small proportion of coloring matter until uniformity in color appears, said portion of the coated saturated particles being only a small part of the whole but large in comparison to said minute proportion of said stimulant, and intermixing the resulting mass with the balance of said treated particles until uniformity in color again appears.

10. A vitamin-hormone type stimulant which undergoes a loss of potency on contact with alkaline material, present in the solid state within and protected by rancid fatty ester against such contact to decrease such loss.

11. A stimulant composition comprising a vitamin-hormone type stimulant within, undissolved by, and protected by rancid fatty ester material capable of protecting said stimulant from loss of potency by material which would normally decrease the potency of said stimulant if in contact therewith.

GEORGE B. BARNHILL.